(12) United States Patent
Sebire et al.

(10) Patent No.: US 10,904,903 B2
(45) Date of Patent: Jan. 26, 2021

(54) SCHEDULING UES WITH MIXED TTI LENGTH

(71) Applicant: Nokia Technologies Oy, Espoo (FI)

(72) Inventors: Benoist Sebire, Tokyo (JP); Chunli Wu, Beijing (CN); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 152 days.

(21) Appl. No.: 15/771,660

(22) PCT Filed: Oct. 25, 2016

(86) PCT No.: PCT/FI2016/050747
§ 371 (c)(1),
(2) Date: Apr. 27, 2018

(87) PCT Pub. No.: WO2017/077179
PCT Pub. Date: May 11, 2017

(65) Prior Publication Data
US 2018/0324834 A1 Nov. 8, 2018

Related U.S. Application Data

(60) Provisional application No. 62/249,570, filed on Nov. 2, 2015.

(51) Int. Cl.
*H04L 12/801* (2013.01)
*H04L 5/14* (2006.01)
(Continued)

(52) U.S. Cl.
CPC ....... *H04W 72/1252* (2013.01); *H04L 1/0007* (2013.01); *H04L 1/0018* (2013.01);
(Continued)

(58) Field of Classification Search
CPC ......... H04W 72/1252; H04W 72/1273; H04W 72/121; H04W 72/0446; H04L 5/0023;
(Continued)

(56) References Cited

U.S. PATENT DOCUMENTS

| 10,200,137 B2* | 2/2019 | Au ........................ H04L 5/0094 |
| 2009/0129362 A1* | 5/2009 | Higuchi ................ H04L 5/0007 370/343 |

(Continued)

FOREIGN PATENT DOCUMENTS

| WO | WO 2008/131262 A1 | 10/2008 |
| WO | WO 2014/189429 A1 | 11/2014 |

(Continued)

OTHER PUBLICATIONS

3GPP TSG-RAN WG2 #91, Beijing, China, "Study of Shorter TTI for Latency Reduction," TDoc R2-153493, Aug. 24-28, 2015, Ericsson, 5 pgs.

(Continued)

*Primary Examiner* — Faruk Hamza
*Assistant Examiner* — Abusayeed M Haque
(74) *Attorney, Agent, or Firm* — Harrington & Smith (57) ABSTRACT

In accordance with an example embodiment of the present invention, a method, including determining, by a user equipment, whether the user equipment is scheduled in one or more time frequency resources of a first transmission time interval or in one or more time frequency resources of a second transmission time interval, where the second transmission time interval is shorter than the first transmission time interval; and based on the determining, adjusting the monitoring of scheduling opportunities within a duration of the first transmission time interval, is disclosed.

13 Claims, 8 Drawing Sheets

(51) Int. Cl.
| | |
|---|---|
| H04W 84/18 | (2009.01) |
| H04W 72/12 | (2009.01) |
| H04L 1/00 | (2006.01) |
| H04L 5/00 | (2006.01) |
| H04L 25/00 | (2006.01) |
| H04W 28/06 | (2009.01) |
| H04W 72/04 | (2009.01) |
| H04W 68/02 | (2009.01) |
| H04L 12/807 | (2013.01) |

(52) U.S. Cl.
CPC .......... *H04L 5/0023* (2013.01); *H04L 5/0082* (2013.01); *H04L 5/0094* (2013.01); *H04L 5/14* (2013.01); *H04L 25/00* (2013.01); *H04W 28/06* (2013.01); *H04W 72/042* (2013.01); *H04W 72/0446* (2013.01); *H04W 72/121* (2013.01); *H04W 72/1273* (2013.01); *H04L 47/27* (2013.01); *H04W 68/02* (2013.01)

(58) Field of Classification Search
CPC ..... H04L 1/0007; H04L 25/00; H04L 5/0094; H04L 5/0082
See application file for complete search history.

(56) References Cited

U.S. PATENT DOCUMENTS

| | | | | |
|---|---|---|---|---|
| 2011/0176500 | A1* | 7/2011 | Wager | H04W 74/0833 370/329 |
| 2012/0213137 | A1* | 8/2012 | Jeong | H04W 72/1289 370/311 |
| 2013/0051358 | A1* | 2/2013 | Turtinen | H04W 72/0453 370/330 |
| 2014/0056278 | A1* | 2/2014 | Marinier | H04W 52/367 370/330 |
| 2014/0071954 | A1 | 3/2014 | Au et al. | 370/336 |
| 2016/0323893 | A1* | 11/2016 | Feng | H04W 72/1226 |
| 2018/0176956 | A1* | 6/2018 | Koutsimanis | H04W 74/0808 |
| 2018/0338291 | A1* | 11/2018 | Herr | H04W 24/02 |
| 2019/0036829 | A1* | 1/2019 | Ji | H04W 76/28 |

FOREIGN PATENT DOCUMENTS

| | | |
|---|---|---|
| WO | WO 2015/096821 A1 | 7/2015 |
| WO | WO 2016/040290 A1 | 3/2016 |

OTHER PUBLICATIONS

3GPP TR 36.881 V0.4.0, "3$^{rd}$ Generation Partnership Project; Technical Specification Group Radio Access Network; Evolved Universal Terrestrial Radio Access (E-UTRA); Study on Latency Reduction Techniques for LTE (Release 13)," TDoc R2-155008, Oct. 2015, 59 pgs.

3GPP TSG RAN WG1 Meeting #83, Anaheim, USA, "Control Signaling Enhancements for Short TTI," R1-156461, Nov. 15-22, 2015, Huawei, HiSilicon, 6 pgs.

* cited by examiner

SCHEDULING UES WITH MIXED TTI LENGTH

TECHNICAL FIELD

This invention relates generally to scheduling user equipment (UEs) (e.g., wireless, portable devices) and, more specifically, relates to scheduling UEs with mixed TTI length.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the main part of the detailed description section.

To avoid network congestion, a TCP sender always maintains a window (called a congestion window) such that a number of packets in transit does not exceed the receiver's ability to receive the packets. TCP flow control has two stages: one is a slow start stage (also referred to as the exponential growth stage) and the second is the congestion avoidance stage (also referred to as the linear stage). Furthermore, a TCP connection starts with a slow start period during which the congestion window size is effectively doubled with each TCP acknowledgement received. The size of the window is increased until the size reaches a threshold (called a slow start threshold) or until a packet is lost. After reaching the threshold, the window size is increased linearly with each TCP acknowledgement received. With shorter latency and shorter RTT, the receiver may acknowledge TCP packets faster, which then enables a faster increase in the TCP window size. Due to this effect, a reduced UL latency can have a large impact on TCP DL performance. Thus, 3GPP TSG RAN has agreed to a new Study Item to investigate new techniques to reduce the latency. See, e.g., Ericsson, Huawei, "New SI proposal: Study on Latency reduction techniques for LTE", RP-150465, 3GPP TSG RAN Meeting #67, Shanghai, China, Mar. 9-12, 2015.

This latency issue may be further exacerbated by using multiple TTI lengths, and it would be beneficial to address this and other issues.

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for scheduling UEs with mixed TTI length. Additional description of these techniques is presented after a system into which the exemplary embodiments may be used is described.

Figure 1:
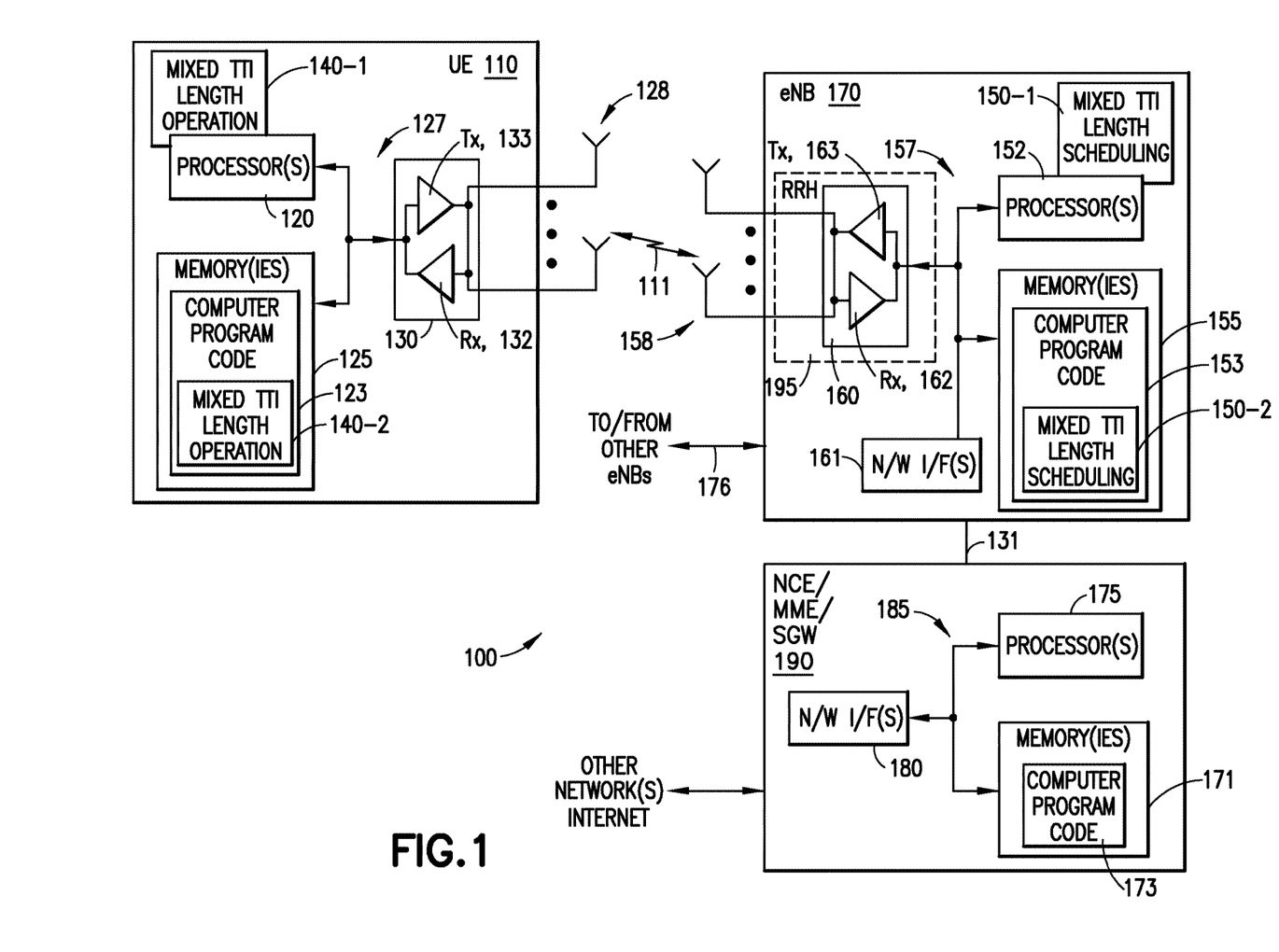
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a mixed TTI length operation module 140, comprising one of or both parts 140-1 and/or 140-2, which may be implemented in a number of ways. The mixed TTI length operation module 140 may be implemented in hardware as mixed TTI length scheduling module 140-1, such as being implemented as part of the one or more processors 120. The mixed TTI length operation module 140-1 may be implemented also as an integrated circuit or through other hardware such as a programmable gate array. In another example, the mixed TTI length operation module 140 may be implemented as mixed TTI length scheduling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (evolved NodeB) 170 is a base station (e.g., for LTE, long term evolution) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes a mixed TTI length scheduling module 150, comprising one of or both parts 150-1 and/or 150-2, which may be implemented in a number of ways. The mixed TTI length scheduling module 150 may be implemented in hardware as mixed TTI length scheduling module 150-1, such as being implemented as part of the one or more processors 152. The mixed TTI length scheduling module 150-1 may be implemented also as an integrated circuit or through other hardware such as a programmable gate array. In another example, the mixed TTI length scheduling module 150 may be implemented as mixed TTI length scheduling module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, eNB 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As previously described, a reduced UL latency can have a large impact on TCP DL performance. Because shorter latency is expensive to provide and can increase overhead, the overall effect is not always significant for the user or can be even detrimental to the system.

For instance, as explained by Ericsson in R2-153489 (Ericsson, "Areas for latency reduction", R2-153489, 3GPP TSG-RAN WG2 #91, Beijing, P.R. China, 24-28 Aug. 2015), since the initial window size for each TCP connection is very small and the increase steeper for each size increment, the effects of latency reductions for both RTT and HARQ RTT are more considerable for the slow start phase.

This is important, as the impact is large for small file sizes, especially where the slow start period lasts for the entire duration of the file.

Further, system level simulations provided by Intel in R2-153292 (Intel Corporation, "Evaluation of TTI reduction gain with additional L1/L2 overhead", R2-153292, 3GPP TSG-RAN WG2 Meeting #91, Beijing, China, Aug. 24-28, 2015) show that for higher-size FTP downloads using TCP, the user perceived throughput may be degraded in the shorter TTI if additional L1/L2 overhead is high.

Additionally, further system level simulations provided by Nokia in R2-153223 (Nokia Networks, "Performance evaluation of latency reduction enhancements", R2-153223, 3GPP TSG-RAN WG2 Meeting #91, Beijing, China, 24-28 Aug. 2015) also show that the potential gain from having a shorter TTI depends on how much L1/L2 overhead is assumed and the load of the cell.

Using a shorter TTI may not always be beneficial, and the inventors have realized that shorter TTIs could be used only when conditions guaranteeing gains are met. For instance, the network could rely on buffer status reports (see 3GPP TS 36.321) or even scheduling requests enhanced with a one-bit indicator as suggested by LGE (see LG Electronics Inc., "Potential area for Latency Reduction", R2-153161, 3GPP TSG-RAN WG2 Meeting #91, Beijing, China, 24-28 Aug. 2015) to check whether the UE has enough data to send or not. Furthermore, the TTI length could be dynamically adjusted via RRC reconfiguration or dynamically via DCI as suggested by Ericsson (see Ericsson, "Study of shorter TTI for latency reduction", R2-153493, 3GPP TSG-RAN WG2 #91, Beijing, China, 24-28 Aug. 2015). Naturally, because different UEs often have different requirements, this would result in operating different TTIs at the same time. There is no discussion of how different TTIs can be operated simultaneously in an efficient manner.

Figure 2:
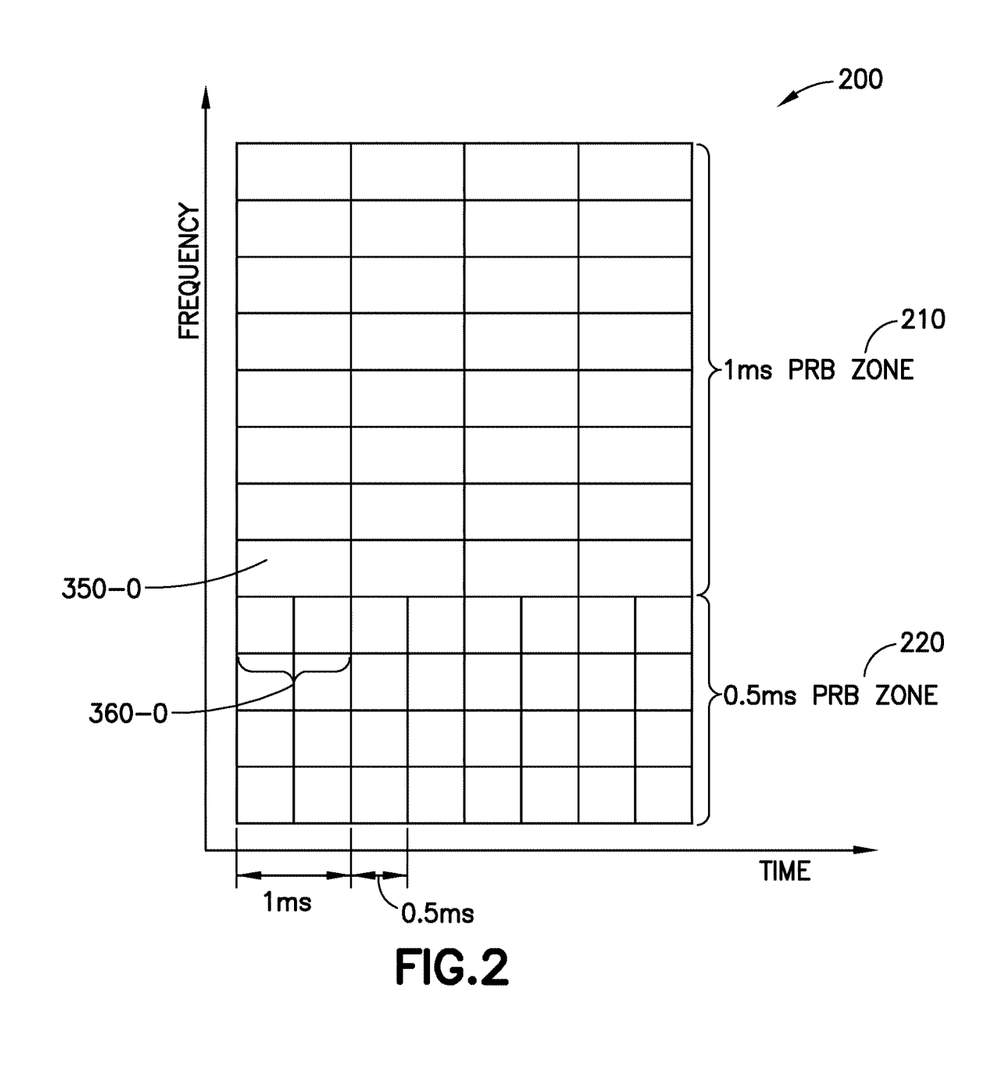
FIG. 2 illustrates a time-frequency resource space for downlink communications.

The exemplary embodiments herein provide examples of how different TTIs can be operated simultaneously in an efficient manner. In the following, it is assumed that two TTI lengths are used: a 1 ms (one millisecond) TTI and a shorter one of 0.5 ms. The exemplary embodiments are not limited to these two TTI lengths. In the following the starting point for an exemplary embodiment is to assume that the PRBs of the frequency domain are divided into two distinct zones: one zone for the 1 ms TTI, and another one for the short TTI. This is illustrated by FIG. 2, which shows a time-frequency resource space 200 for downlink communications. The resource space 200 includes a 1 ms PRB zone 210, where each PRB has a TTI of 1 ms, and includes a 0.5 ms PRB zone 220 where each PRB has a TTI of 0.5 ms. The frequency range is illustrated by the y axis and is divided into the two zones 210, 220.

In an exemplary embodiment, PRB zones could be allocated to the different TTI lengths so that the UE knows the TTI length the UE is going to use. Alternatively the control information could explicitly give the TTI length.

In an exemplary embodiment, for TTI shorter than 0.5 ms, e.g., 2 OFDM symbols, legacy PDCCH region would be reserved for legacy PDCCH, thus 2 symbol TTI would only start in the PDSCH region. Then the legacy PDCCH could still be used for scheduling the first 2 OFDM symbols of shorter TTI following the PDCCH region.

To allow scheduling UEs in the PRB zone 220 of the 0.5 ms TTI, the possibility to schedule a UE twice every 1 ms TTI is introduced in an exemplary embodiment: every 1 ms, a first downlink control information for the first 0.5 ms TTI is followed by a second downlink control information for the second 0.5 ms TTI. A legacy PDCCH region can be used to schedule both 1 ms TTI PDSCH and shorter TTI PDSCH (e.g., the few OFDM symbol(s) following the legacy PDCCH region, the first 0.5 ms within the 1 ms in this example). For the rest of the OFDM symbols (the second 0.5 ms within the 1 ms in this example), a shorter TTI is scheduled by the shorter TTI zone. Another possible way is both the first 0.5 ms and second 0.5 ms are scheduled by PDCCH in the 0.5 ms PRB zone.

When the UE 110 is configured with shorter TTI, TTI length can be dynamically changed between shorter TTI and legacy TTI, but the UE 110 only operates with one TTI length at a point in time. The UE shall monitor PDCCH of a shorter TTI zone unless 1 ms TTI PDSCH is scheduled, which covers the whole subframe in the time domain. That is, in an exemplary embodiment:

The UE 110 shall monitor PDCCH of a shorter TTI zone when no PDSCH was scheduled in the 1 ms TTI PRB zone 210 at the same OFDM symbol of the shorter TTI zone (the 0.5 ms TTI PRB zone 220).

The UE 110 does not monitor PDCCH of a shorter TTI zone when PDSCH was scheduled in the 1 ms TTI PRB zone 210 at the same OFDM symbol of the shorter TTI zone (the 0.5 ms TTI PRB zone 220).

In other words, reception of the PDSCH scheduled by legacy PDCCH at the beginning of the subframe takes precedence over PDCCH monitoring of the later OFDM symbols for shorter TTI.

It is noted that the eNB 170 implementation, in an embodiment, should ensure the eNB does not schedule both TTI lengths (in the 1 ms TTI PRB zone 210 and the 0.5 ms TTI PRB zone) at the same subframe, otherwise the UE 110 will miss one of them. It should also be noted that the downlink control information can correspond to PDCCH or any scheduling information such as DL or UL control information.

It is noted that PDSCH here only refers to PDSCH scheduled by PDCCH addressed to UE's C-RNTI, other than PDSCH scheduled by PDCCH addressed to P-RNTI or SI-RNTI which is for paging and system information, respectively. The requirement specified in 3GPP TS 36.302 for simultaneous reception of PDCCH address to P-RNTI/SI-RNTI/C-RNTI should still be applicable with mixed TTI length, e.g., when the UE is reading PDSCH for SIB with 1 ms TTI length scheduled by PDCCH addressed SI-RNTI, it should still be possible to schedule the UE with either 1 ms or 0.5 ms TTI length with PDCCH addressed to C-RNTI.

It is noted that PDCCH here covers both PDCCH and EPDCCH.

Figure 3:
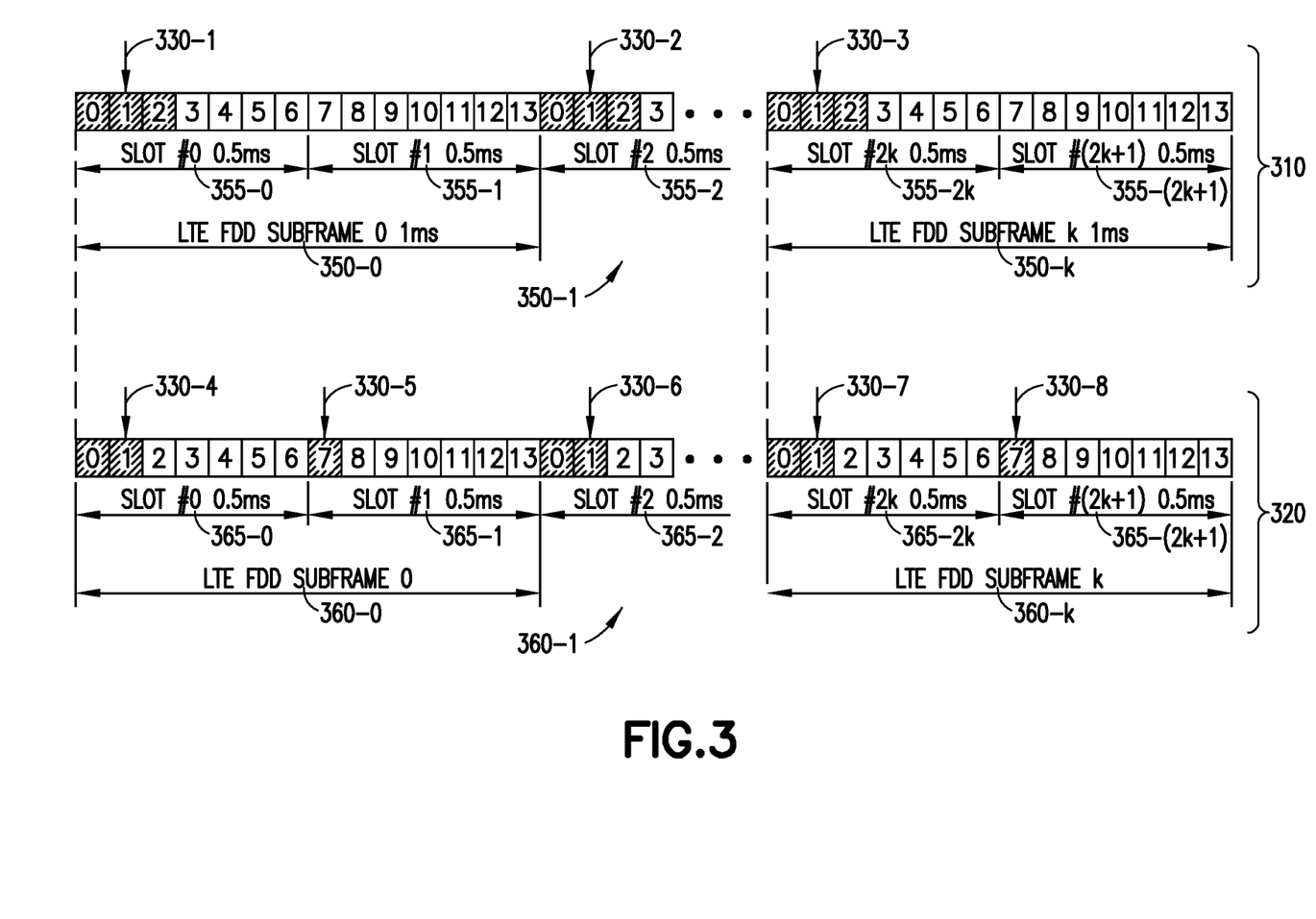
FIG. 3 is an illustration of a legacy LTE frame structure and a new LTE frame structure with short TTI, where both frame structures are for FDD.

In order to operate the UE efficiently and manage the interaction between PRB zones and downlink control information for scheduling, a number of rules are proposed below. Before describing the rules, it is helpful to outline differences between a legacy LTE frame structure and a new LTE frame structure with short TTI. FIG. 3 is an illustration of such a legacy LTE frame structure 310 and an LTE frame structure 320 with short TTI, where both frame structures are for FDD. FIG. 3 is zoom in of the 1 ms subframe in FIG. 2, where 350 is in the 1 ms TTI zone and 360 is the 0.5 ms TTI zone. The legacy LTE frame structure 310 includes k+1 (K=9) LTE FDD subframes 350-0 through 350-k, each of which has two slots, each of which is 0.5 ms in duration. The LTE FDD subframe 350-0 has slots 355-0 and 355-1, the LTE FDD subframe 350-1 has slots 355-2 and 355-3 (355-3 is not shown), . . . , and the LTE FDD subframe 350-k has slots 355-2k and 355-(2k+1). The new LTE frame structure 320 includes k+1 LTE FDD subframes 360-0 through 360-k, each of which has two slots, each of which is a TTI of 0.5 ms in duration. The LTE FDD subframe 360-0 has slots 365-0 and 365-1, the LTE FDD subframe 360-1 has slots 365-2 and 365-3 (365-3 is not shown), . . . , and the LTE FDD subframe 360-$k$ has slots 365-$2k$ and 365-$(2k+1)$. Each slot 355, 365 has seven OFDM symbols, numbered 0-6 for a first slot (e.g., 355-0 or 365-0) and numbered 7-13 for a second slot (e.g., 355-1 or 365-1).

The UE 110 may read the PDCCH for the LTE FDD subframes 350 at the locations 330-1, 330-2, and 330-3, which means the UE 110 may read the PDCCH for the OFDM symbols 0, 1, or 2 (of 14 OFDM symbols) for each LTE FDD subframe 350. The UE 110 may read the PDCCH for the LTE FDD subframes 360 at the locations 330-4, 330-5, 330-6, 330-7, and 330-8, which means the UE 110 may read the PDCCH for the OFDM symbols 0, 1, or 7 (of OFDM symbols 0 to 13) for each LTE FDD subframe 360.

The following are possible rules that may be used in order to operate the UE efficiently and manage the interaction between PRB zones and downlink control information for scheduling. Note that these rules are exemplary and are not an exhaustive list, nor does each rule have to be implemented.

Figure 4:
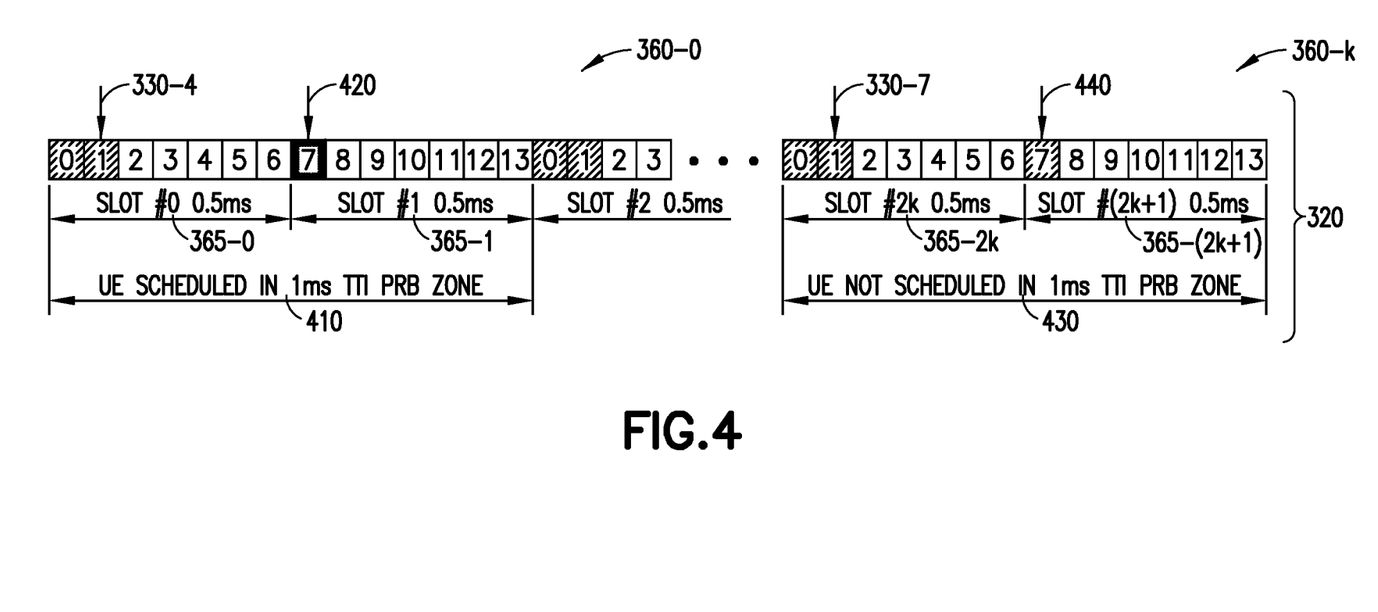
FIGS. 4, 5, and 6 are illustrations of a new LTE frame structure and illustrate examples of possible rules (Rule 1, 2, and 3, respectively) for operating a UE efficiently and managing an interaction between PRB zones and downlink control information for scheduling.

Rule 1. If the UE 110 is scheduled by the first downlink control information in the 1 ms TTI PRB zone 210, the UE 110 skips the second downlink control information. From the perspective of the eNB 170, the eNB 170 does not schedule the UE 110 in the second 0.5 ms TTI if the UE 110 is scheduled in the 1 ms TTI zone.

Rule 1 is illustrated by FIG. 4. FIG. 4 is an illustration of a new LTE frame structure and illustrates an example of a possible rule (Rule 1) for operating a UE efficiently and managing an interaction between PRB zones and downlink control information for scheduling. This example shows the new LTE FDD subframe 360-0 of FIG. 3 and the new LTE FDD subframe 360-$k$. In this example, because the UE 110 is scheduled (as illustrated by reference number 410) by the first downlink control information in the 1 ms TTI PRB zone 210 (that is, in LTE FDD subframe 350-0), the UE 110 skips (as illustrated by reference number 420) reading the PDCCH in the OFDM symbol 7 of the slot 365-1. It is noted that the UE 110 would read the PDCCH in OFDM symbols 0, 1, and/or 2 in slot 355-0 of legacy LTE FDD subframe 350-0 to determine the scheduling, and the scheduling typically includes scheduling the UE 110 to read the PDSCH of subsequent OFDM symbol(s). In the second example, showing the LTE FDD subframe 360-$k$ of FIG. 3, because the UE 110 is not scheduled (as illustrated by reference number 430) by the first downlink control information in the 1 ms TTI PRB zone 210 (that is, in LTE FDD subframe 350-$k$), the UE 110 reads (as illustrated by reference 440) the PDCCH in the OFDM symbol 7 of the slot 365-$(2k+1)$.

Rule 2. If the UE is scheduled by the first downlink control information in the 0.5 ms TTI PRB zone 220, the UE 110 also needs to read the second downlink control information. From the perspective of the eNB 170, the eNB 170 may schedule the UE 110 in the second 0.5 ms TTI, if UE is scheduled in the first 0.5 ms TTI.

Figure 5:
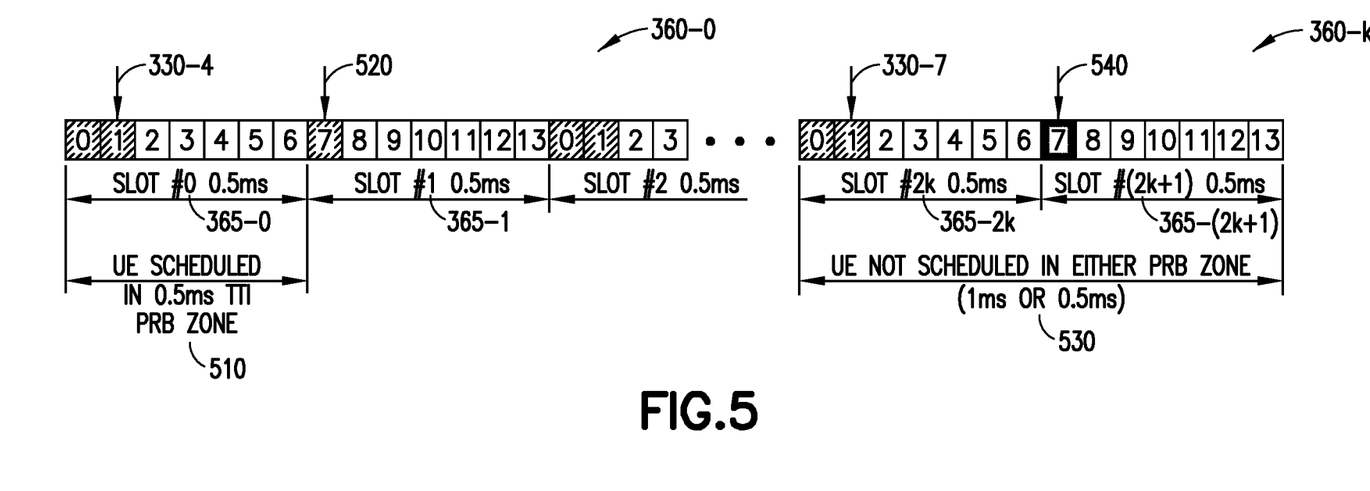

FIG. 5 provides an example of Rule 2. This example shows the new LTE FDD subframe 360-0 and the new LTE FDD subframe 360-$k$ of FIG. 3. In this example, the UE 110 is scheduled (as illustrated by reference number 510) by the first downlink control information in the 0.5 ms TTI PRB zone 220 (that is, in the OFDM symbols 0 and 1 of the new LTE FDD subframe 360-0), the UE 110 reads (as illustrated by reference number 520) the PDCCH in the OFDM symbol 7 of the slot 365-1. For Rule 2 and 3, it could be that the UE is independently schedulable in the first and/or second 0.5 ms TTI. If the first 0.5 ms (see reference number 330-7) is not scheduled (see reference number 530), the UE should still read the second 0.5 ms TTI (see reference number 540), in an exemplary embodiment.

Figure 6:
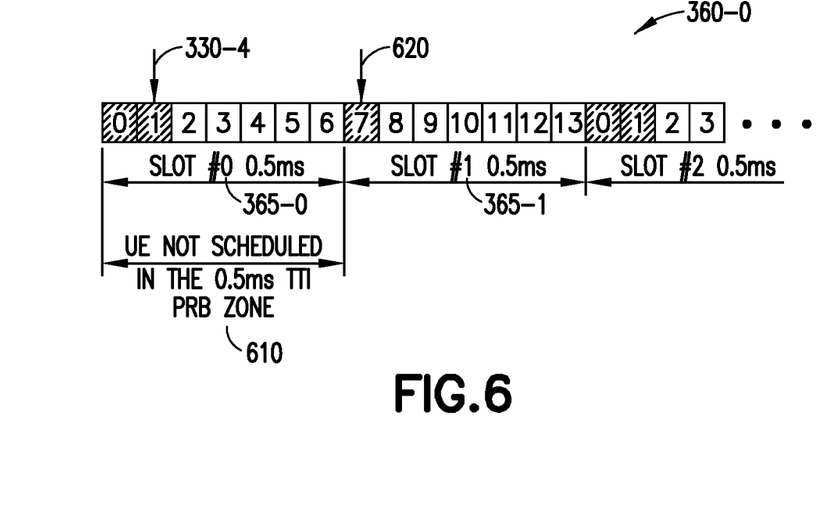

Rule 3. If the UE 110 is not scheduled by the first downlink control information in the 0.5 ms TTI PRB zone, the UE 110 also needs to read the second downlink control information. FIG. 6 is used to provide an example of Rule 3. This example shows the new LTE FDD subframe 360-0 of FIG. 3. The UE 110 is not scheduled (as illustrated by reference number 610) by the first downlink control information in the 0.5 ms TTI PRB zone 220 (that is, in the OFDM symbols 0 and 1 of the new LTE FDD subframe 360-0), the UE 110 reads (as illustrated by reference number 620) the PDCCH in the OFDM symbol 7 of the slot 365-1.

Furthermore, in order to enhance the reliability of the control information when scheduling the UE uses the 1 ms TTI PRB zone:

Rule 4. If the UE 110 is scheduled by the first downlink control information in the 1 ms TTI PRB zone 210, the UE also reads the first and/or the second downlink control information (from the 0.5 ms TTI PRB zone 210) and if scheduled decodes the PDSCH of 1 ms TTI and 0.5 ms TTI simultaneously.

Whether the Rule 4 applies or not could be configured, e.g., by RRC signaling by the network. Additionally, only a subset of the rules could be used, either by fixing them in specifications or configuring them by RRC. Changing of TTI zones could be performed via system information or configured via dedicated RRC signaling, i.e., which is not that dynamic.

Figure 7:
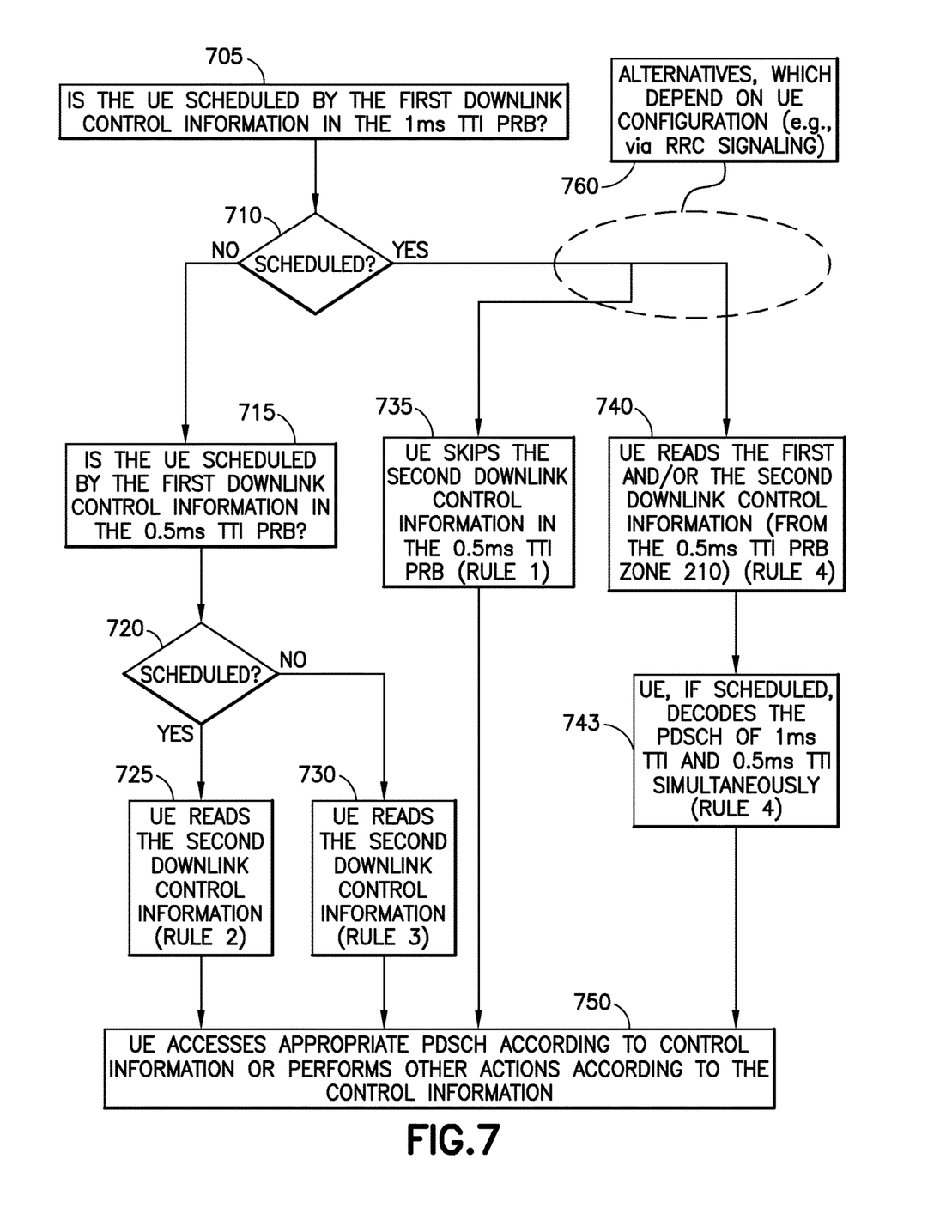
FIG. 7 is a logic flow diagram performed by a UE for scheduling of UEs with mixed TTI length, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 7, this figure is a logic flow diagram performed by a UE scheduled with mixed TTI length. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the mixed TTI length operation module 140 may include multiples ones of the blocks in FIG. 7, where each included block is an interconnected means for performing the function in the block. The blocks in FIG. 7 are assumed to be performed by the UE 110, e.g., under control of the mixed TTI length operation module 140 at least in part. Note that FIG. 7 includes all the rules as described above, but this is merely for exposition, and some rules may not be included in certain implementations.

In block 705, the UE determines if the UE is scheduled by the first downlink control information in the 1 ms TTI PRB 210. The UE may determine this by searching for the control information in the 1 ms TTI PRB 210. If the UE finds information, then it's been scheduled. If the UE is scheduled (block 710=Yes), as indicated by block 760, the UE 110 has two options in an example, which depend on configuration of the UE. As described above, the UE may be configured by the eNB 170 using, e.g., RRC signaling. As one alternative, the UE skips (block 735) the second downlink control information in the 0.5 ms TTI PRB 220. As another alternative, in block 740, the UE 110 reads the first and/or the second downlink control information (from the 0.5 ms TTI PRB zone 210). The UE in block 743, if scheduled, decodes the PDSCH of 1 ms TTI and 0.5 ms TTI simultaneously. For both blocks 740 and 743, see the description for Rule 4.

If the UE is not scheduled for the 1 ms TTI (block 710=No), in block 715, the UE 110 determines if the UE scheduled by the first downlink control information in the 0.5 ms TTI PRB 220. Note that there are two alternatives for scheduling the first 0.5 ms TTI, either via legacy PDCCH, or via 0.5 ms zone PDCCH, but should be no need to read both in parallel. For the option of scheduled via legacy PDCCH region, PDCCH will indicate PDSCH is 1 ms or 0.5 ms. This step is performed by the UE searching for control information in the 0.5 ms TTI PRB, and if the UE finds the control information, the UE then determines the UE has been scheduled. If the UE has been scheduled by the first downlink control information in the 0.5 ms TTI PRB 220 (block 720=Yes), the UE in block 725 reads the second downlink control information. See the Rule 2 description above and also FIG. 5. If the UE has not been scheduled by the first downlink control information in the 0.5 ms TTI PRB 220 (block 720=No), the UE in block 730 reads the second downlink control information. See the Rule 3 description above and also FIG. 6.

In block 750, the UE accesses the appropriate PDSCH according to the control information or performs other actions corresponding to the control information. PDCCH can be used for initiating RACH (with PDCCH order), or for SPS activation/deactivation, and the like. The appropriate PDSCH could be in the 1 ms TTI PRB 210 or the 0.5 ms TTI PRB 220.

Figure 8:
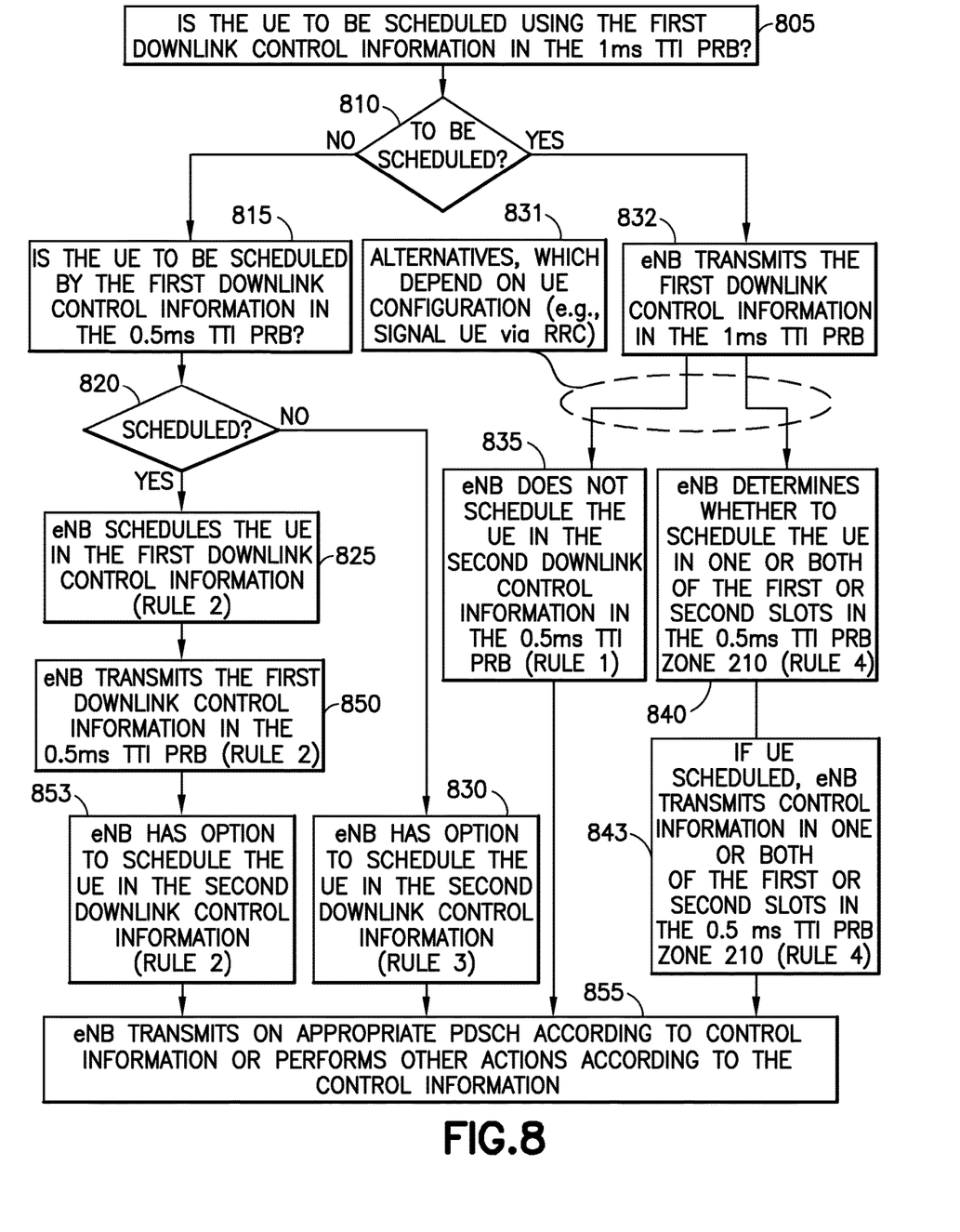
FIG. 8 is a logic flow diagram performed by a base station for scheduling of UEs with mixed TTI length, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 8, this figure is a logic flow diagram performed by a base station for scheduling of UEs with mixed TTI length. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the mixed TTI length scheduling module 150 may include multiples ones of the blocks in FIG. 8, where each included block is an interconnected means for performing the function in the block. The blocks in FIG. 8 are assumed to be performed by a base station such as eNB 170, e.g., under control of the mixed TTI length scheduling module 150 at least in part. As with FIG. 7, all rules above are shown in FIG. 8, although this is merely exemplary.

It should be noted that for, e.g., blocks 820 and 825, whether the eNB 170 can schedule the UE in the second 0.5 ms slot should not depend on whether the UE is scheduled in the first 0.5 ms slot. While the UE monitors PDCCH, this does not mean the eNB has to schedule the UE. Instead, this only means the eNB can schedule the UE if eNB decides to schedule the UE. FIG. 8 below considers these steps to be positive steps of scheduling or not scheduling the UE, but this is for ease of exposition only, and the eNB could instead consider the second 0.5 ms TTI as schedulable and transmit PDCCH to the UE if a determination is made to schedule the UE.

In block 805, the eNB 170 determines whether the UE is to be scheduled using the first downlink control information in the 1 ms TTI PRB. If so (block 810=Yes), the eNB 170 transmits in block 832 the first downlink control information in the 1 ms TTI PRB 210 (which the UE would read in reference to block 705). There are two alternatives, as indicated by block 831. These alternatives depend on UE configuration and the eNB 170 can signal the configuration to the UE via RRC. In the alternative of block 835, the eNB 170 eNB does not schedule the UE in the second downlink control information in the 0.5 ms TTI PRB 220. See the description above of Rule 1 and FIG. 4. The UE would perform block 735. In the alternative of blocks 840 and 843, the eNB 170 determines (block 840) whether to schedule the UE in one or both of the first or second slots in the 0.5 ms TTI PRB zone 210, and if scheduled, transmits (block 843) control information in one or both of the first or second slots in the 0.5 ms TTI PRB zone 210. See the description of Rule 4 above. The UE in response would perform blocks 740 and 743.

If the UE is not to be scheduled by the first downlink control information in the 1 ms TTI PRB (block 810=No), the eNB 170 determines (block 815) whether the UE is to be scheduled by the first downlink control information in the 0.5 ms TTI PRB 220. If so (block 820=Yes), in block 825, the eNB 170 schedules the UE 110 in the first downlink control information. In block 850, the eNB transmits the first downlink control information in the 0.5 ms TTI PRB. In block 853, the eNB 170 has an option to schedule the UE in the second downlink control information. For blocks 825, 850, and 853 see the description of Rule 2 and FIG. 4 above. The UE performs block 725 in response to the transmission of the second downlink control information. If the UE 110 is to be scheduled by the first downlink control information in the 0.5 ms TTI PRB 220 (block 820=No), in block 830, the eNB 170 has the option to schedule the UE in the second downlink control information. See the description of Rule 3 and FIG. 5 above.

The eNB 170, in block 855, may transmit on an appropriate PDSCH of 1 ms TTI or 0.5 ms TTI according to the control information or perform other actions according to the control information.

The following are additional examples based on the above description.

Figure 9:
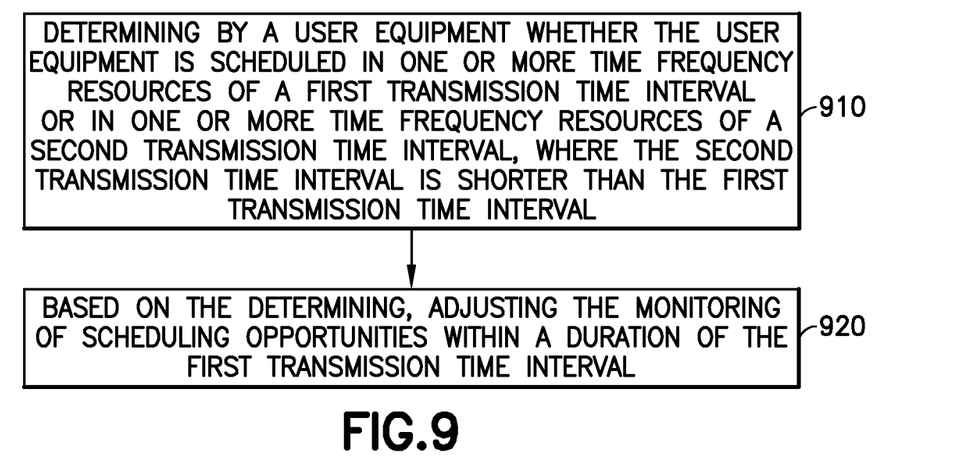
FIG. 9 is a logic flow diagram performed by a UE for scheduling of UEs with mixed TTI length, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 9, this figure is a logic flow diagram performed by a UE scheduled with mixed TTI length. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the mixed TTI length operation module 140 may include multiples ones of the blocks in FIG. 9, where each included block is an interconnected means for performing the function in the block. The blocks in FIG. 9 are assumed to be performed by the UE 110, e.g., under control of the mixed TTI length operation module 140 at least in part.

In block 910, a method (called example 1 herein) includes determining (block 910) by a user equipment whether the user equipment is scheduled in one or more time frequency resources of a first transmission time interval or in one or more time frequency resources of a second transmission time interval, where the second transmission time interval is shorter than the first transmission time interval. In block 920, the method includes (block 920), based on the determining, adjusting the monitoring of scheduling opportunities within a duration of the first transmission time interval. In the following, the method of FIG. 9 is referred to as example 1, and additional examples are laid out below.

Example 2

The method of example 1, wherein: the one or more time frequency resources of the second transmission time interval comprise at least first and second locations where the user equipment can monitor scheduling opportunities; determining whether the user equipment is scheduled further comprises determining the user equipment is scheduled in a time frequency resource of the first transmission time interval; and adjusting further comprises skipping by the user equipment a scheduling opportunity in the second location in the second transmission time interval.

Example 3

The method of example 1, wherein: the one or more time frequency resources of the second transmission time interval comprise at least first and second locations where the user equipment can monitor scheduling opportunities; determining whether the user equipment is scheduled further comprises determining the user equipment is scheduled in a time frequency resource of the first transmission time interval; and adjusting further comprises reading by the user equipment a physical downlink control channel for the first location, the second location, or both the first and the second location.

Example 4

The method of example 3, wherein the method further comprises the user equipment, in response to being scheduled in the first location, the second location, or both the first or second locations, simultaneously decoding control information in a physical downlink control channel of the first time frequency resource and control information in a physical downlink control channel of the second time frequency resource.

Example 5

The method of examples 2 or 3, wherein the user equipment determines to perform only one of the skipping or the reading based on user equipment configuration.

Example 6

The method of example 5, further comprising receiving an indication of the user equipment configuration from radio resource control signaling.

Example 7

The method of any of examples 1 to 6, wherein: the one or more time frequency resources of the second transmission time interval comprise at least first and second locations where the user equipment can monitor scheduling opportunities; determining whether the user equipment is scheduled further comprises determining the user equipment is not scheduled in a time frequency resource of the first transmission time interval but is scheduled in a time frequency resource of the second transmission time interval; and adjusting further comprises reading by the user equipment a physical downlink control channel for the second location in the second transmission time interval.

Example 8

The method of any of examples 1 to 6, wherein: the one or more time frequency resources of the second transmission time interval comprise at least first and second locations where the user equipment can monitor scheduling opportunities; determining whether the user equipment is scheduled further comprises determining the user equipment is not scheduled in a time frequency resource of the first transmission time interval and is not scheduled in a time frequency resource of the second transmission time interval; and adjusting further comprises reading by the user equipment a physical downlink control channel for the second location in the second transmission time interval.

Example 9

The method of any of examples 2 to 8, wherein the locations comprise locations within physical resource blocks.

Example 10

The method of example 9, wherein each location comprises one or more orthogonal frequency division multiplexing symbols.

Example 11

The method of any of examples 1 to 10, further comprising, in response to the user equipment accessing control information for a scheduling opportunity, the user equipment accessing a physical downlink control channel according to the control information or performing one or more other actions in response to the control information.

Figure 10:
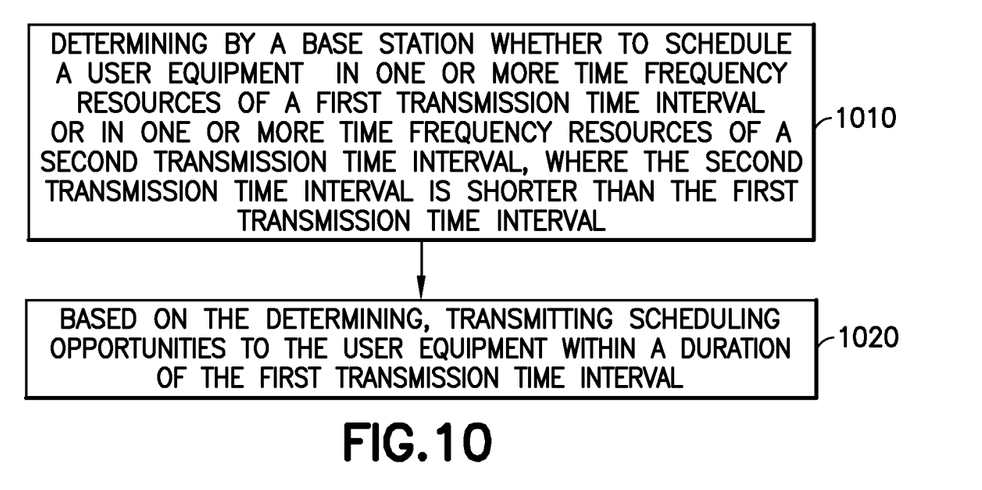
FIG. 10 is a logic flow diagram performed by a base station for scheduling of UEs with mixed TTI length, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 10, this figure is a logic flow diagram performed by a base station for scheduling of UEs with mixed TTI length. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the mixed TTI length scheduling module 150 may include multiples ones of the blocks in FIG. 10, where each included block is an interconnected means for performing the function in the block. The blocks in FIG. 10 are assumed to be performed by a base station such as eNB 170, e.g., under control of the mixed TTI length scheduling module 150 at least in part.

The method in FIG. 10 includes (block 1010) determining by a base station whether to schedule a user equipment in one or more time frequency resources of a first transmission time interval or in one or more time frequency resources of a second transmission time interval, where the second transmission time interval is shorter than the first transmission time interval. The method also includes (block 1020), based on the determining, transmitting scheduling opportunities to the user equipment within a duration of the first transmission time interval. The method illustrated in FIG. 10 is also called example 12 herein.

Example 13

The method of example 12, wherein: the one or more time frequency resources of the second transmission time interval comprise at least first and second locations where the base station can transmit scheduling opportunities; determining whether to schedule a user equipment further comprises determining to schedule the user equipment in a time frequency resource of the first transmission time interval; transmitting further comprises transmitting configuration information to the user equipment in a first time-frequency resource of the first transmission time interval, but not scheduling or transmitting a scheduling opportunity in the second location of the second transmission time interval.

Example 14

The method of example 13, wherein: the one or more time frequency resources of the second transmission time interval comprise at least first and second locations where the user equipment can monitor scheduling opportunities; determining whether to schedule a user equipment further comprises determining to schedule the user equipment in a time frequency resource of the first transmission time interval; and transmitting further comprises transmitting configuration information to the user equipment in a first time-frequency resource of the first transmission time interval, determining whether to schedule the user equipment in one or both of the first and second locations, and in response to a determination the user equipment is scheduled in one or both of the first and second locations, transmitting control information to the user equipment in one or both of the first and second locations.

Example 15

The method of examples 13 or 14, further comprising transmitting an indication of user equipment configuration in radio resource control signaling, wherein the user equipment configuration is defined to perform one of: cause the user equipment to skip reading the second location to correspond with the not scheduling or transmitting a scheduling opportunity in the second location; or to cause the user equipment to read control information for scheduling opportunities for one or both of the first and second locations.

Example 16

The method of any of examples 12 to 15, wherein: the one or more time frequency resources of the second transmission time interval comprise at least first and second locations where the user equipment can monitor scheduling opportunities; determining whether to schedule a user equipment comprises not scheduling the user equipment in a time frequency resource of the first transmission time interval but scheduling the user equipment in a time frequency resource of the second transmission time interval; and transmitting further comprises transmitting for the user equipment control information in a physical downlink control channel for the second location in the second transmission time interval.

Example 17

The method of any of examples 12 to 15, wherein: the one or more time frequency resources for the second transmission time interval comprise at least first and second locations where the user equipment can monitor scheduling opportunities; determining whether to schedule a user equipment comprises not scheduling the user equipment in a time frequency resource of the first transmission time interval and determining whether to schedule the user equipment in a time frequency resource of the second transmission time interval; and transmitting further comprises transmitting, in response to determining the user equipment should be scheduled in the time frequency resource of the second transmission time interval, for the user equipment control information in a physical downlink control channel for the second location in the second transmission time interval.

Example 18

The method of any of examples 13 to 17, wherein the locations comprise locations within physical resource blocks.

Example 19

The method of example 18, wherein each location comprises one or more orthogonal frequency division multiplexing symbols.

Example 20

The method of any of examples 12 to 19, further comprising, in response to transmitting control information for a scheduling opportunity, transmitting information in a physical downlink control channel according to the control information or performing one or more other actions in response to the control information.

Example 21

Another example includes an exemplary apparatus that includes one or more processors and one or more memories including computer program code. The one or more memories and the computer program code are configured to, with the one or more processors, cause the apparatus to perform any of the methods of examples 1-11.

Example 22

An additional exemplary embodiment includes a computer program, comprising code for performing the method of any of the examples 1-11, when the computer program is run on a processor. The computer program according to this paragraph, wherein the computer program is a computer program product comprising a computer-readable medium bearing computer program code embodied therein for use with a computer.

Example 23

An apparatus comprising means for determining by a user equipment whether the user equipment is scheduled in one or more time frequency resources of a first transmission time interval or in one or more time frequency resources of a second transmission time interval, where the second transmission time interval is shorter than the first transmission time interval; and means, responsive to the determining, for adjusting the monitoring of scheduling opportunities within a duration of the first transmission time interval.

Example 24

The apparatus of this paragraph, comprising means for performing any of the methods of examples 2-11.

Example 25

Another example includes an exemplary apparatus that includes one or more processors and one or more memories including computer program code. The one or more memories and the computer program code are configured to, with the one or more processors, cause the apparatus to perform any of the methods of examples 12-20.

Example 26

An additional exemplary embodiment includes a computer program, comprising code for performing the method of any of the examples 12-20, when the computer program is run on a processor. The computer program according to this paragraph, wherein the computer program is a computer program product comprising a computer-readable medium bearing computer program code embodied therein for use with a computer.

Example 27

An apparatus comprising means for determining by a base station whether to schedule a user equipment in one or more time frequency resources of a first transmission time interval or in one or more time frequency resources of a second transmission time interval, where the second transmission time interval is shorter than the first transmission time interval; and means, responsive to the determining, for transmitting scheduling opportunities to the user equipment within a duration of the first transmission time interval.

Example 28

The apparatus of this paragraph, comprising means for performing any of the methods of examples 13-20.

Example 29

A communication system, comprising any of the apparatus of examples 21, 23 or 24 and any of the apparatus of examples 25, 27 or 28. Example 30. A user equipment comprising any of the apparatus of examples 21, 23 or 24. Example 31. A base station comprising any of the apparatus of examples 25, 27 or 28.

Without in any way limiting the scope, interpretation, or application of the claims appearing below, a technical effect and advantage of one or more of the example embodiments disclosed herein is improved scheduling mechanisms, taking better advantage of the shorter TTI resolution for those UEs that benefit the most out of it. Another technical effect and advantage of one or more of the example embodiments disclosed herein is as a UE power saving mechanism (as the UE is allowed to skip reading certain PDCCH, when the UE knows that the UE will not be scheduled). Another technical effect and advantage of one or more of the example embodiments disclosed herein is improved reliability of 1 ms TTI scheduling.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership
C-RNTI cell radio network temporary identifier
DL downlink (from base station to UE)
eNB (or eNodeB) evolved Node B (e.g., an LTE base station)
EPDCCH enhanced PDCCH
FDD frequency division duplexing
FTP file transfer protocol
HARQ hybrid automatic repeat request
I/F interface
L1 physical layer
L2 MAC layer
LTE long term evolution
MAC medium access control
MME mobility management entity
ms milliseconds
NCE network control element
N/W network
OFDM orthogonal frequency division multiplexing
PDCCH physical downlink control channel
PDSCH physical downlink shared channel
PRB physical resource block
P-RNTI paging-radio network temporary identifier
RACH random access channel
RAN radio access network
RRC radio resource control
RRH remote radio head
RTT round-trip time
Rx receiver
SGW serving gateway
SI study item
SI-RNTI system information-radio network temporary identifier
SPS semi-persistent scheduling
TCP transmission control protocol
TS technical standard
TSG technical specification group
TTI transmission time interval
Tx transmitter
UE user equipment (e.g., a wireless, typically mobile device)
UL uplink (from UE to base station)

The invention claimed is:

1. An apparatus comprising: at least one processor; and
at least one memory including computer program code wherein the at least one memory and the computer program code are configured to, with the at least one processor, cause the apparatus at least to perform the following:
determine, by a user equipment, whether the user equipment is scheduled in one or more time-frequency resources of a first transmission time interval or in one or more time-frequency resources of a second transmission time interval, where the second transmission time interval is shorter than the first transmission time interval, wherein the one or more time-frequency resources of the second transmission time interval comprise at least first and second locations where the user equipment can monitor scheduling opportunities, and the determining determines the user equipment is scheduled in a time-frequency resource of the first transmission time interval;

based on the determining, adjust the monitoring of scheduling opportunities within a duration of the first transmission time interval, wherein the adjusting further comprises reading by the user equipment a physical downlink control channel for the first location, the second location, or both the first and the second location; and in response to being scheduled in the first location, the second location, or both the first or second locations, simultaneously decode control information in a physical downlink control channel of the one or more time-frequency resources of the first transmission time interval and control information in a physical downlink control channel of the one or more time-frequency resources of the second transmission time interval.

2. The apparatus according to claim 1, wherein: the adjusting further comprises skipping by the user equipment a scheduling opportunity in the second location in the second transmission time interval.

3. The apparatus according to claim 2, wherein the user equipment determines to perform only one of the skipping or the reading based on user equipment configuration.

4. The apparatus according to claim 3, wherein the at least one memory and the computer program code are further configured to, with the at least one processor, cause the apparatus to: receive an indication of the user equipment configuration from radio resource control signaling.

5. The apparatus according to claim 1, wherein the first and second locations comprise locations within physical resource blocks.

6. The apparatus according to claim 5, wherein each location comprises one or more orthogonal frequency division multiplexing symbols.

7. An apparatus comprising: at least one processor; and at least one memory including computer program code, wherein the at least one memory and the computer program code are configured to, with the at least one processor, cause the apparatus at least to perform the following:

determine, by a base station, whether to schedule a user equipment in one or more time-frequency resources of a first transmission time interval or in one or more time-frequency resources of a second transmission time interval, where the second transmission time interval is shorter than the first transmission time interval, wherein the one or more time-frequency resources of the second transmission time interval comprise at least first and second locations where the base station can transmit scheduling opportunities, and wherein the determining whether to schedule a user equipment further comprises determining to schedule the user equipment in a time-frequency resource of the first transmission time interval; and based on the determining, transmit scheduling opportunities to the user equipment within a duration of the first transmission time interval, wherein the transmitting comprises:

transmitting configuration information to the user equipment in a time-frequency resource of the first transmission time interval, determining to schedule the user equipment in one or both of the first and second locations; and transmit control information in a physical downlink control channel of the one or more time-frequency resources of the first transmission time interval and control information in a physical downlink control channel of the one or more time-frequency resources of the second transmission time interval, the transmission of control information allowing the user equipment to simultaneously decode the control information in the physical downlink control channel of the one or more time-frequency resources of the first transmission time interval and the control information in the physical downlink control channel of the one or more time-frequency resources of the second transmission time interval.

8. The apparatus according to claim 7, wherein: the transmitting comprises transmitting configuration information to the user equipment in a first time-frequency resource of the first transmission time interval, but not scheduling or transmitting a scheduling opportunity in the second location of the second transmission time interval.

9. A method, comprising:

determining, by a user equipment, whether the user equipment is scheduled in one or more time-frequency resources of a first transmission time interval or in one or more time-frequency resources of a second transmission time interval, where the second transmission time interval is shorter than the first transmission time interval, wherein the one or more time-frequency resources of the second transmission time interval comprise at least first and second locations where the user equipment can monitor scheduling opportunities, and the determining determines the user equipment is scheduled in a time-frequency resource of the first transmission time interval;

based on the determining, adjusting the monitoring of scheduling opportunities within a duration of the first transmission time interval, wherein the adjusting further comprises reading by the user equipment a physical downlink control channel for the first location, the second location, or both the first and the second location; and in response to being scheduled in the first location, the second location, or both the first or second locations, simultaneously decoding control information in a physical downlink control channel of the one or more time-frequency resources of the first transmission time interval and control information in a physical downlink control channel of the one or more time-frequency resources of the second transmission time interval.

10. The method according to claim 9, wherein: the adjusting comprises skipping by the user equipment a scheduling opportunity in the second location in the second transmission time interval.

11. The method according to claim 9, wherein the locations comprise locations within physical resource blocks.

12. The method according to claim 11, wherein each location comprises one or more orthogonal frequency division multiplexing symbols.

13. The method according to claim 10, wherein the user equipment determines to perform only one of the skipping or the reading based on user equipment configuration.

* * * * *